(12) United States Patent
Canchi et al.

(10) Patent No.: US 9,311,943 B2
(45) Date of Patent: Apr. 12, 2016

(54) COMPENSATION OF LASER DIODE INTRODUCED FLYING HEIGHT CHANGES

(71) Applicant: HGST Netherlands B.V., Amsterdam (NL)

(72) Inventors: Sripathi Vangipuram Canchi, San Jose, CA (US); Lidu Huang, Danville, CA (US); Erhard Schreck, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/182,187

(22) Filed: Feb. 17, 2014

(65) Prior Publication Data

US 2015/0235663 A1    Aug. 20, 2015

(51) Int. Cl.
*G11B 5/60*    (2006.01)
*G11B 5/48*    (2006.01)
*G11B 5/00*    (2006.01)

(52) U.S. Cl.
CPC .............. *G11B 5/607* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,315,128 B1 | 11/2012 | Wilson et al. | |
| 8,320,220 B1 | 11/2012 | Yuan et al. | |
| 8,369,191 B2 | 2/2013 | Shimazawa | |
| 8,406,090 B2 | 3/2013 | Juang et al. | |
| 8,451,696 B2 | 5/2013 | Huang et al. | |
| 8,456,980 B1 | 6/2013 | Thayamballi | |
| 8,619,508 B1 * | 12/2013 | Krichevsky et al. | 369/13.11 |
| 8,787,125 B1 * | 7/2014 | Lee | 369/13.26 |
| 8,861,317 B1 * | 10/2014 | Yan et al. | 369/13.33 |
| 8,922,929 B1 * | 12/2014 | Ruan et al. | 360/55 |
| 8,970,982 B1 * | 3/2015 | Zhou et al. | 360/75 |
| 2004/0121520 A1 * | 6/2004 | Karkkainen | 438/107 |
| 2008/0225426 A1 * | 9/2008 | Roy et al. | 360/31 |
| 2011/0228651 A1 | 9/2011 | Gage et al. | |
| 2012/0201108 A1 | 8/2012 | Zheng et al. | |
| 2012/0243390 A1 | 9/2012 | Lennard et al. | |

OTHER PUBLICATIONS

"Passive Thermal FH Adjust to Compensate Temperature Driven Head Disk Spacing Changes" IP.com Prior Art Database Disclosure, IP.com Disclosure No. IPCOM000010443D; Dec. 2002.

* cited by examiner

*Primary Examiner* — Wayne Young
*Assistant Examiner* — Mark Fischer
(74) *Attorney, Agent, or Firm* — Patterson & Sheridan, LLP (57) ABSTRACT

Embodiments described herein generally relate to controlling the flying height of a slider. The methods can include transmitting radiation from a radiation source, determining a change in temperature, the change in temperature being the difference between a first temperature and an ambient temperature and changing the flying height of the slider and head based on the change in temperature. The devices generally include a head with a supporting surface and a media facing surface, a radiation source submount, a radiation source, and a temperature sensor positioned proximate the radiation source submount or the radiation source.

16 Claims, 6 Drawing Sheets

COMPENSATION OF LASER DIODE INTRODUCED FLYING HEIGHT CHANGES

BACKGROUND OF THE INVENTION

1. Field of the Invention

Embodiments disclosed herein generally relate to methods and apparatus for controlling flying height of a slider and a head.

2. Description of the Related Art

Hard disk drives (HDD) include read and write transducers that reside within a slider, which flies over a recording media/disk. Increasing demand in data density requires that the read and write transducers fly closer to the media. As flying heights diminish, it becomes more relevant to accurately control the head-disk distance (i.e., the distance between the read-write heads and the disk). Accordingly, the fly-height between the slider and disk is increasingly important as storage densities also increase.

Heat assisted magnetic recording (HAMR) generally refers to the concept of locally heating a recording media to reduce the coercivity of the media so that an applied magnetic writing field can more easily direct the magnetization of the media during the temporary magnetic softening of the media caused by the heat source. This technique is broadly referred to as "thermally assisted (magnetic) recording" (TAR or TAMR), "energy assisted magnetic recording" (EAMR), or "heat-assisted magnetic recording" (HAMR) which are used interchangeably herein. A tightly confined, high power laser light spot is used to heat a portion of the recording media to substantially reduce the coercivity of the heated portion. Then the heated portion is subjected to a magnetic field that sets the direction of magnetization of the heated portion. In this manner, the coercivity of the media at ambient temperature can be much higher than the coercivity during recording, thereby enabling stability of the recorded bits at much higher storage densities and with much smaller bit cells.

High levels of optical radiation are needed in the HAMR recording head in order to provide rapid heating of magnetic media. A radiation source, such as a laser diode, that produces such levels of optical radiation in combination with a light delivery system is desired. As the radiation source delivers radiation to the recording media for localized heating, the radiation source itself and connected areas of the slider body also heat up. This heating causes a distortion of the slider shape, which leads to flying height changes.

A thermal flying-height control (TFC) device (e.g., a heater element) can be disposed within a slider to contort the slider near the read and write transducers (or elements), which lowers the fly-height for the read and write transducers. With a slider flying as close as possible to a disk, the change in flight dynamics from the heating of the radiation source may cause write element slider-media contact (WEC) to occur. WEC can then create unstable slider-flight dynamics, which in turn, creates data imprint errors in the media.

Thus, there is a need for better control of flying height in magnetic recording devices.

SUMMARY OF THE INVENTION

The embodiments described herein generally relate to methods for controlling the flying height of a slider body and HAMR heads that effectively compensate for slider body expansion due to the heating from the light source. In one embodiment, a HAMR head includes a head body having a supporting surface and a media facing surface positioned opposite the supporting surface; a radiation source submount positioned on the supporting surface; a radiation source positioned on the supporting surface, wherein the radiation source is disposed proximate the radiation source submount; a waveguide coupled between the support surface and the media facing surface; and a temperature sensor positioned a first distance from the radiation source submount, the first distance being between 5 nm and 100 nm.

In another embodiment, a method for adjusting flying height includes transmitting radiation from a radiation source, the radiation source being connected with a slider, wherein the radiation source heats a first portion of the slider; determining a first temperature, the first temperature corresponding to the temperature of the radiation source; determining a second temperature, the second temperature being an ambient temperature; determining a change in temperature, the change in temperature being the difference between the first temperature and the second temperature; and changing the flying height of the slider based on the change in temperature.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

During extended use, the radiation source on the slider can heat up. The flying height change of the slider is proportional to the change in the radiation source temperature. By detecting the temperature change between the radiation source, the portion of the slider proximate the radiation source or combinations thereof and the ambient temperature of the device, and compensating in a linear fashion, the flying height can be maintained even during long use cycles. This change in temperature can be determined by measuring the change in electrical resistance at the radiation source. Further, this change in temperature can be determined using a thermal sensor, such as an electrically resistive sensor. The electrically resistive sensor can be positioned near the radiation source submount on the flex side of the slider. Embodiments disclosed herein can be more clearly understood with reference to the figures below.

Figure 1:
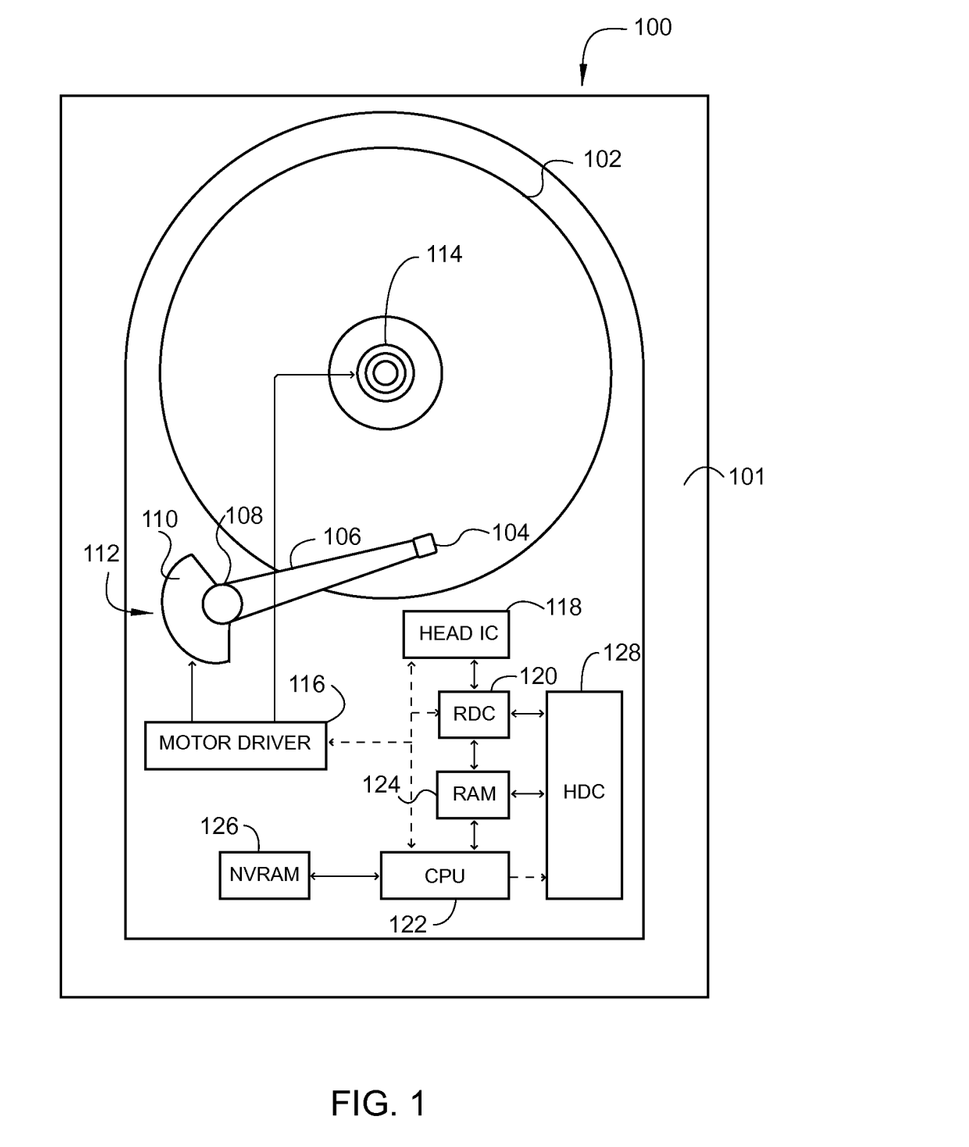
FIG. 1 is a schematic diagram illustrating a configuration of a magnetic disk apparatus according to one embodiment.

FIG. 1 is a schematic diagram illustrating a configuration of a magnetic disk apparatus (hereinafter also referred to as a "HDD") 100, according to one embodiment. The HDD 100 is an electronic device that communicates with a host system (not shown). The HDD 100 according to the present embodiment has a mechanism structure including a magnetic disk 102, a slider 104, an arm 106, a bearing 108; a VCM (Voice Coil Motor) 110 and an SPM (Spindle Motor) 114. The slider 104, the arm 106, the bearing 108 and the VCM 110 integrally constitute a structure that is referred to as an HSA (Head Stack Assembly) 112. Further, the HDD 100 includes functional blocks of a circuit system, such as a motor driver 116, a head IC 118, a read/write channel IC (hereinafter also referred to as an "RDC") 120, a CPU 122, a RAM 124, an NVRAM 126, and an HDC (Hard Disk Controller) 128.

The HDD 100 according to the present embodiment supplies a driving current to the VCM 110, thereby rotating the HSA 112 using the bearing 108 as a rotation center. A rotation angle of the HSA 112 is limited to a given range. An adherent substance might be adhered to a part of the slider 104. The HDD 100 supplies a driving current to the VCM 110 and thus rotates the HSA 112, thereby removing the adherent substance from the slider 104. In many cases, the adherent substance is lubricating oil or the like applied onto the magnetic disk.

The magnetic disk 102 is fixed to the SPM 114, and is rotated by driving the SPM 114. At least one surface of the magnetic disk 102 serves as a recording surface on which information is magnetically recorded.

The slider 104 is provided at one end of the arm 106 so as to be associated with the recording surface of the magnetic disk 102. The read head on the slider 104 reads a signal magnetically recorded on the recording surface of the magnetic disk 102, and outputs the read signal to the head IC 118. Furthermore, in response to a write signal (write current) fed from the head IC 118, the write head on the slider 104 magnetically records information on the recording surface of the magnetic disk 102. The slider 104 slides over the recording surface of the magnetic disk 102.

The arm 106 is provided at its one end with the slider 104. In response to the supply of a driving current to the VCM 110, the arm 106 rotates using the bearing 108 as a rotation center, and moves the slider 104 radially over the recording surface of the magnetic disk 102.

The bearing 108 serves as the rotation center of the HSA 112 by inserting a shaft (not shown) to be fixed to an enclosure of the HDD 100. The VCM 110 is driven in response to a driving signal (current) supplied from the motor driver 116, thereby rotating the arm 106 on the shaft. The HSA 112 is the structure integrally constituted by the slider 104, the arm 106, the bearing 108 and the VCM 110. In response to the supply of a driving current to the VCM 110, the HSA 112 moves the slider 104, provided at one end of the arm 106, using the bearing 108 as the rotation center. The rotation angle of the HSA 112 is limited to a given range.

The SPM 114 is driven in response to a driving signal (current) supplied from the motor driver 116, thereby rotating the magnetic disk 102. Based on control carried out by the CPU 122, the motor driver 116 supplies, to the VCM 110 and the SPM 114, the driving signals for driving the VCM 110 and the SPM 114, respectively.

The head IC 118 amplifies a signal fed from a read head (not shown) provided at the slider 104, and outputs, as read information, the amplified signal to the RDC 120. Further, the head IC 118 outputs, to a write head (shown in FIG. 2) provided at the slider 104, a write signal (write current) responsive to recording information fed from the RDC 120.

The RDC 120 performs a given process on the read information, fed from the head IC 118, to decode the read information, and outputs, as transfer information, the decoded information to the HDC 128. Furthermore, the RDC 120 performs a given process on information, which has been fed from the HDC 128 and should be recorded, to encode the information, and outputs, as recording information, the encoded information to the head IC 118. The RDC 120 utilizes the RAM 124 as a work memory in performing the given processes for encoding and decoding. The RAM 124 is a work memory for the RDC 120, the CPU 122 and the HDC 128. In one embodiment, the RAM 124 is a DRAM serving as a volatile memory.

The NVRAM 126 is a nonvolatile memory for storing a program executed by the CPU 122. The program stored in the NVRAM 126 is updatable. In accordance with a program stored in the NVRAM 126, the CPU 122 controls each block included in the HDD 100. The CPU 122 is a processor for controlling rotational operations of the VCM 110 and the SPM 114. The CPU 122 utilizes the RAM 124 as a work memory in executing the program. In the present embodiment, with the aim of removing an adherent substance adhered to the slider 104, the CPU 122 performs control so as to rotate the VCM 110 to a position at which the adherent substance does not interfere with the recording surface of the magnetic disk 102. This control is carried out using given timing as a trigger.

The HDC 128 carries out a communication process for transmitting and receiving information to and from the host system 150. The HDC 128 performs a given process on the transfer information, fed from the RDC 120, to encode the transfer information, and transmits, as transmission information, the encoded information to the host system 150. Moreover, the HDC 128 performs a given process on reception information, received from the host system 150, to decode the reception information, and outputs, as information that should be recorded, the decoded information to the RDC 120. For example, the HDC 128 carries out the communication process with the host system 150 in accordance with a SATA (Serial Advanced Technology Attachment) standard.

With the above-described configuration, an adherent substance adhered to the slider 104 is removed using a plurality of blocks included in the HDD 100 according to the present embodiment. Accordingly, in the HDD 100 according to the present embodiment, an adherent substance adhered to the slider is allowed to be effectively removed without being influenced by the recording surface of the magnetic disk. These processes are realized by carrying out a plurality of processes mainly by the CPU 122.

The above description of a typical magnetic disk storage system and the accompanying illustration are for representation purposes only. It should be apparent that disk storage systems may contain a large number of disks and actuators, and each actuator may support a number of sliders.

Figure 2:
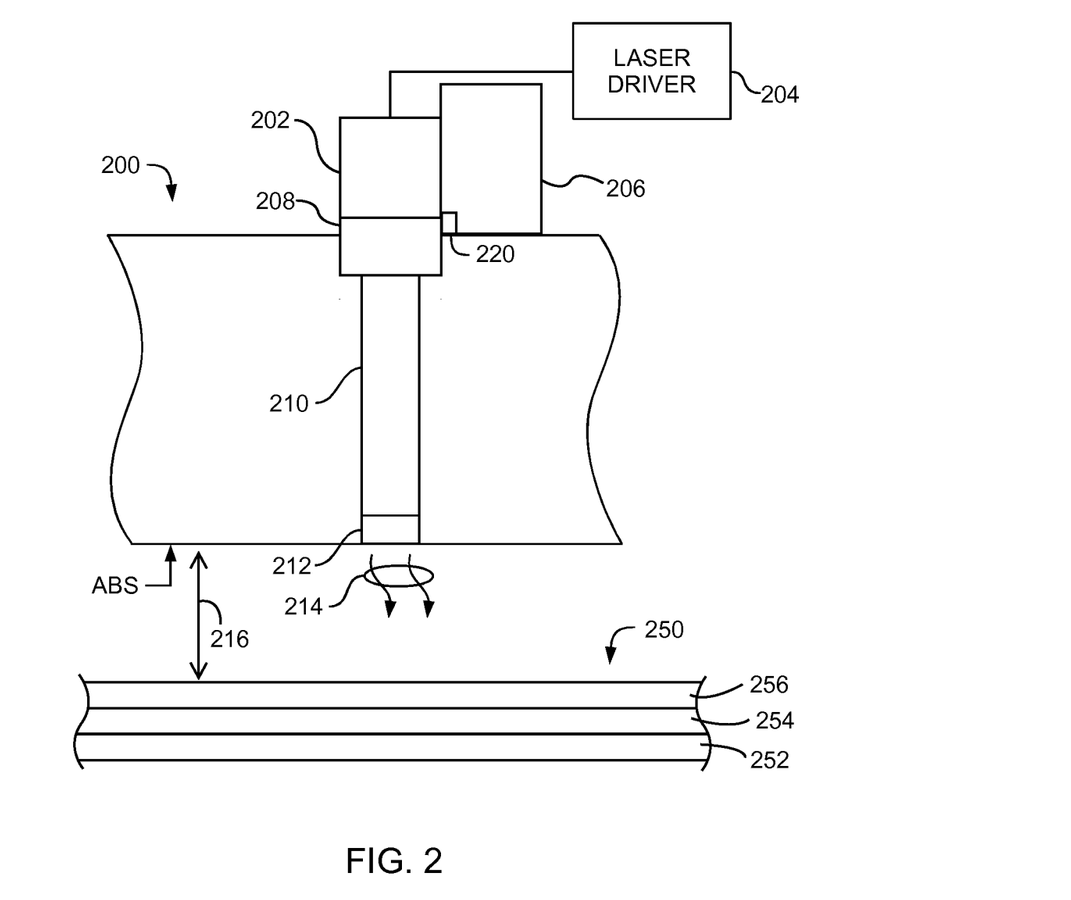
FIG. 2 is a cross sectional schematic of a HAMR enabled write head on a slider, according to one embodiment.

FIG. 2 is a cross sectional schematic of a HAMR enabled write head, according to one embodiment. The head 200 is operatively attached to a radiation source 202 that is powered by a radiation driver 204. The radiation source 202 may be placed directly on the head 200 or radiation may be delivered from a radiation source 202 located off the slider through an optical fiber or waveguide. Similarly, the radiation driver 204 circuitry may be located on the slider 104 or on a system-on-chip (SOC) associated with the disk drive 100. A radiation source submount 206 can be positioned on the head 200. The radiation source submount 206 can further be positioned in connection with the radiation source 202. The head 200 includes a spot-size converter 208 for focusing the radiation transmitted by the radiation source 202 into a waveguide 210. In another embodiment, the disk drive 100 may include one or more lens for focusing the radiation of the radiation source 202 before the emitted radiation reaches the spot-size converter 208.

The waveguide 210 is a channel that transmits the radiation through the height of the head 200 to the near-field transducer 212—e.g., a plasmonic device—which is located at or near the media facing surface (MFS), such as an air bearing surface (ABS). The near-field transducer 212 further focuses the beamspot to avoid heating neighboring tracks of data on a magnetic disk 250—i.e., creates a beamspot much smaller than the diffraction limit. As shown by arrows 214, this optical energy emits from the near-field transducer 212 to the surface of the magnetic disk 250 below the MFS of the head 200. The embodiments herein are not limited to any particular type of near-field transducer and may operate with, for example, either a c-aperture, e-antenna plasmonic near-field source, or any other shaped transducer known in the art.

A temperature sensor 220 may be located proximate to the radiation source 202. The radiation source 202 does not convert the entire energy input into radiation for heating the magnetic disk 250. In one embodiment, where the radiation source 202 is a laser diode, the radiation source 202 converts 50% of the energy received into light, such as coherent light, and 50% is released as heat. Because the radiation source 202 is unable to convert all of the energy received into radiation for the magnetic disk 250, the unused energy subsequently heats the slider 104 itself. The temperature sensor 220 may be a thermistor or resistance temperature detector (RTD) where the electrical resistance of the material comprising the temperature sensor 220 changes as the temperature of the material varies (either inversely or directly). The temperature sensor 220 may be electrically coupled to the radiation driver 204 or some other control device to measure the electrical resistance of the temperature sensor 220. The detected temperature at the temperature sensor 220 can then be compared to the drive temperature, which is readily available. The change in temperature may then be used as a feedback control signal to adjust the fly height of the head 200.

The magnetic disk 250 is positioned adjacent to or under the head 200. The magnetic disk 250 includes a substrate 252, which may be made of any suitable material, such as ceramic glass or amorphous glass. A soft magnetic underlayer 254, which is optional, can be deposited on the substrate 252. The soft magnetic underlayer 254 may be made of any suitable material such as, for example, alloys or multilayers having Co, Fe, Ni, Pd, Pt or Ru. A hard magnetic recording layer 256 is deposited on the soft underlayer 254, with the perpendicular oriented magnetic domains 56 contained in the hard layer 256. Suitable hard magnetic materials for the hard magnetic recording layer 256 can include at least one material having a relatively high anisotropy at ambient temperature, such as FePt or CoCrPt alloys.

The head 200 directs the radiation source 202 to heating the magnetic disk 250 proximate to where the write pole applies the magnetic write field to the magnetic disk 250. The transmitted radiant energy, generally designated by arrows 214, is delivered through the near-field transducer 212 to the surface of the magnetic disk 250 for heating a localized area of the magnetic disk 250, and particularly for heating a localized area of the hard magnetic layer 256.

During operation of a TAR or HAMR enabled head 200, the rotation of the magnetic disk 250 generates an air cushion between the MFS of the slider 104 and the surface of the magnetic disk 250 which exerts an upward force or lift on the head 200. The air flow thus counter-balances the slight spring force of the arm 106, shown with reference to FIG. 1, and supports the head 200 off and slightly above the magnetic disk 250 surface by a small, substantially constant spacing during normal operation, which is denoted by a distance 216. The radiation source 202 heats up the high-coercivity data bits so that the write elements of the head 200 may correctly magnetize the data bits.

Figure 3A:
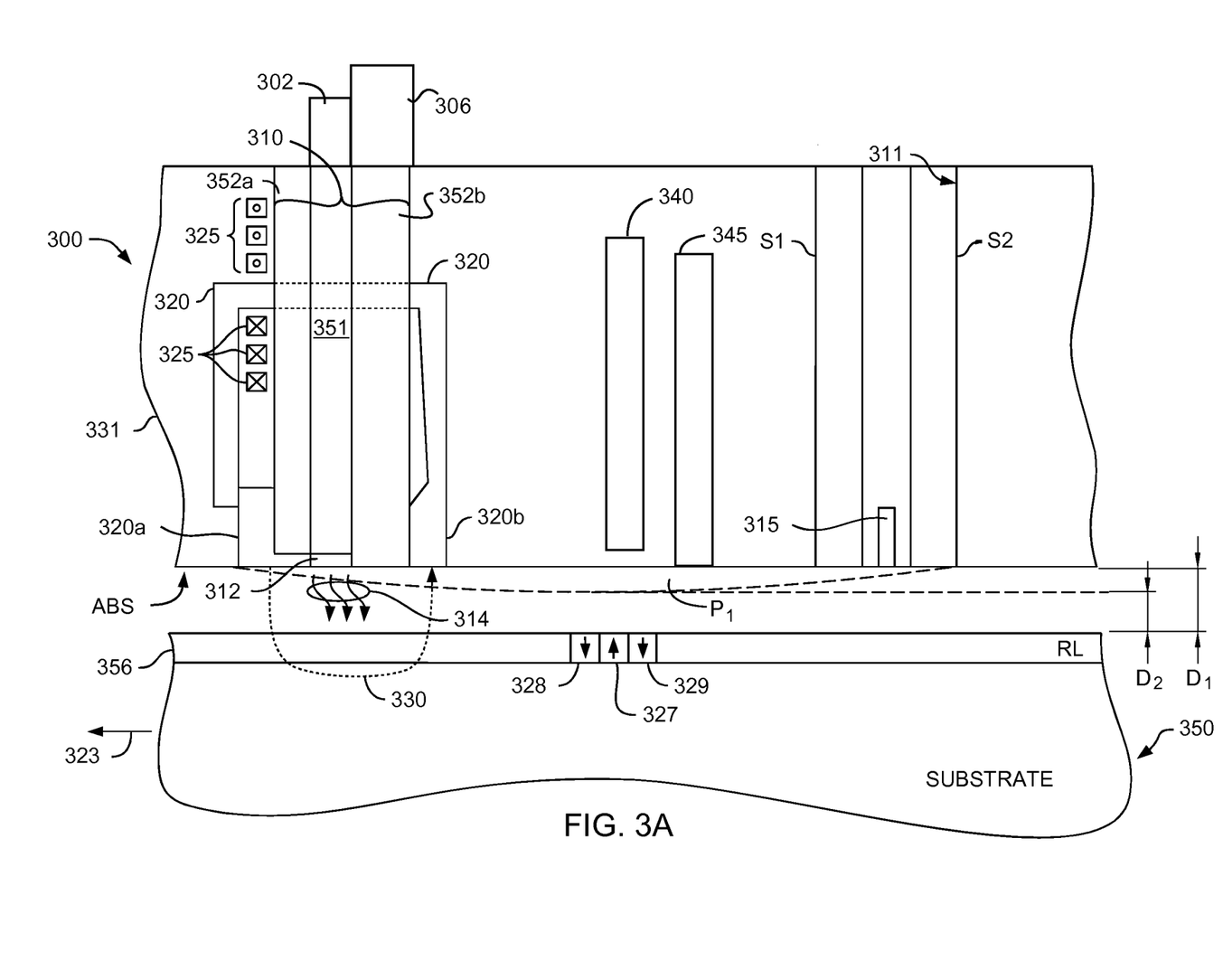
FIGS. 3A-3C illustrate a cross-sectional schematic diagram of a TAR enabled disk drive, according to one embodiment of the invention.
Figure 3B:
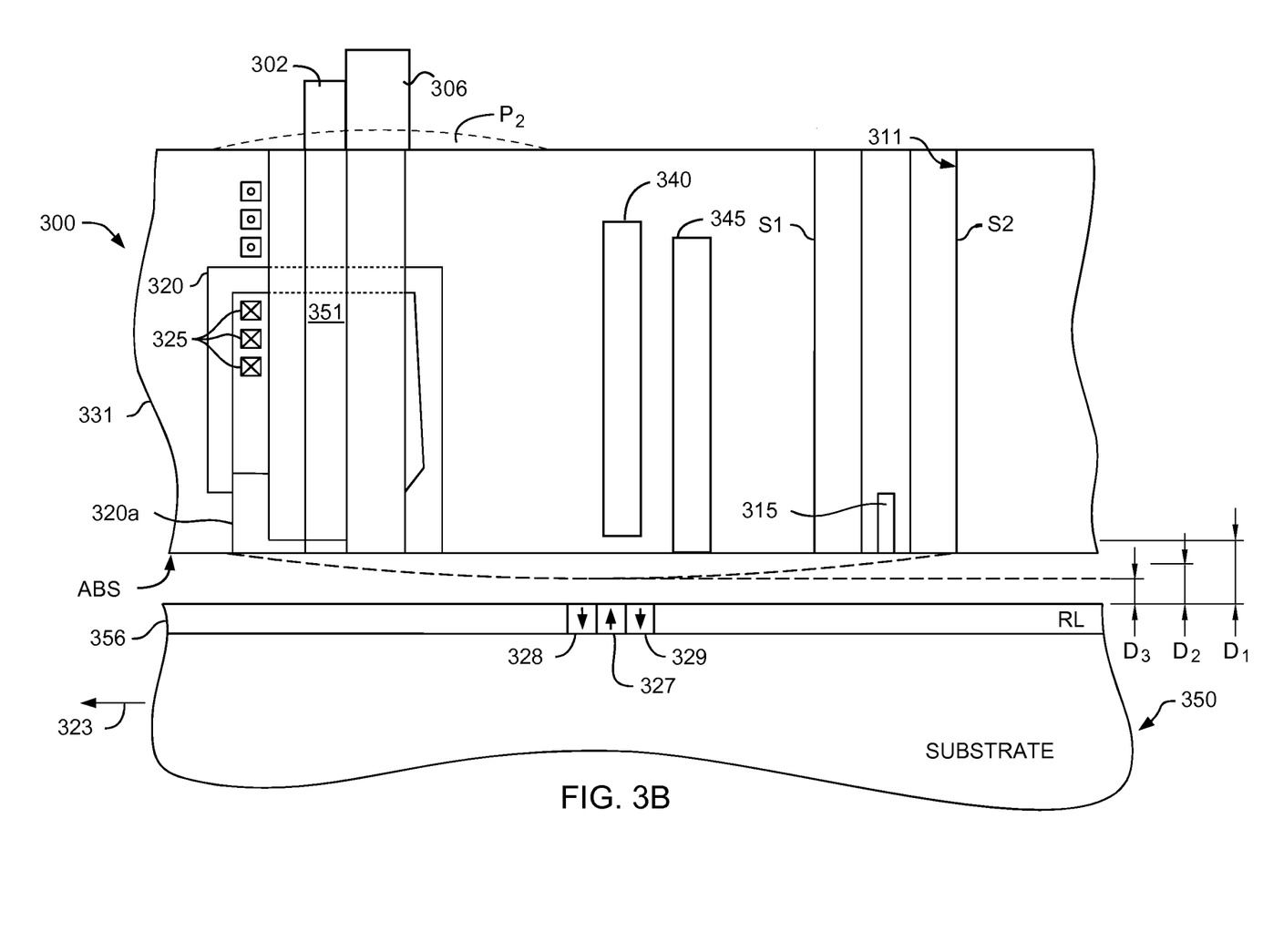
Figure 3C:
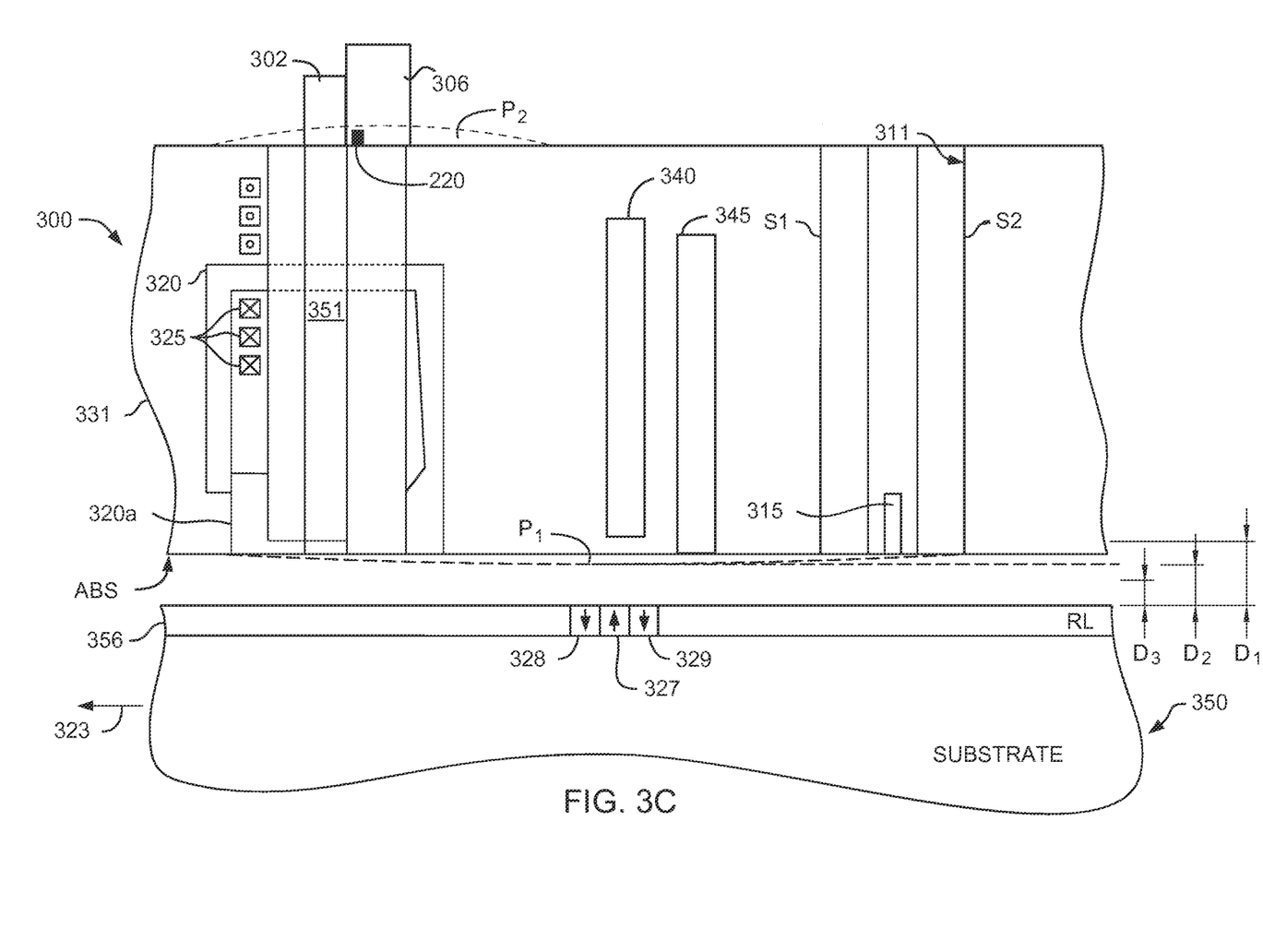

FIGS. 3A-3C illustrate a cross-sectional schematic diagram of a TAR enabled disk drive, according to one embodiment of the invention. Specifically, FIGS. 3A-3C illustrate a portion of an air-bearing head and associated perpendicular magnetic recording disk 350 for a TAR disk drive which uses an optical channel or waveguide 310 for directing heat to the disk. The magnetic disk 350 includes a substrate and a perpendicular magnetic recording layer (RL) 356. In one embodiment, the magnetic disk 350 may include an optional "soft" or relatively low-coercivity magnetically permeable underlayer (SUL), depicted as layer 254 of FIG. 2. However, the SUL is not required for a HDD 100.

The RL 356 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 356 may also be an $L1_0$ ordered alloy such as FePt or FeNiPt. The magnetic disk 350 may also include a protective overcoat (not shown) over the RL 356.

The head 300 has a trailing surface 311 and an MFS surface oriented generally perpendicular to trailing surface 311. The head 300 is typically formed of a composite material, such as a composite of alumina/titanium-carbide ($Al_2O_3$/TiC), and supports the read and write elements which are typically formed as a series of thin films and structures on the trailing surface 311. The magnetic disk 350 may spin in a direction 323 away from the trailing surface and towards the other layers of the head 300. The MFS is the recording-layer-facing surface of the slider that faces the magnetic disk 350. Note that FIGS. 3A-3C are not drawn to scale because of the difficulty in showing the very small features and, for the sake of clarity, omits structures from the head such as spacing and insulating layers.

The head 300 includes a conventional magnetoresistive read pole 315 located between shields S1 and S2, and a conventional perpendicular write head that includes a magnetic yoke 320 with a write pole 320a, a return pole 320b, and an electrically conductive write coil 325. The write pole 320a is formed of conventional high-moment material, such as a NiFe or FeCoNi alloy. The write coil 325 is wrapped around the yoke 320 with the electrical current directions being shown as into the paper by the coil cross-sections marked with an "X" and out of the paper by the coil cross-sections marked with a solid circle. When write-current pulses are directed through the coil 325, the write pole 320a directs magnetic flux 330, represented by an arrow, to the RL 356. Further, the magnetic flux 330 continues through the substrate or a SUL layer before arriving at the return pole 320b. However, the invention is not limited to the structure and material discussed above. For example, the coil 325 may be a helical coil or the write pole 320a may include a wrap-around shield. Further, the embodiments discussed herein may operate with any recording head that can perform the functions discussed herein.

The head 300 may also include a waveguide 310 with a near-field transducer 312 near or at the MFS. As shown, the waveguide 310 and near-field transducer 312 extend through the yoke 320 and are located between the write pole 320a and the return pole 320b. As noted by the ghosted lines, the yoke 320 may continuously connect the write pole 320a to the return pole 320b. The waveguide 310 and near-field transducer 312 may be fabricated at any location such that the near-field transducer 312 passes over a portion of the spinning magnetic disk 350 prior to that portion passing below the write pole 320a. Specifically, the waveguide 310 may be located between shield S2 and return pole 320b, or between the write pole 320b and the outer face 331 of the head 300 (if the magnetic disk 350 rotates opposite of the direction 323 shown).

While writing to the magnetic disk 350, the RL 356 moves relative to the head 300 in the direction shown by arrow 323. In TAR, the optical energy 314 emitted from the transducer 312 temporarily lowers the coercivity ($H_c$) of the RL 356 so that the magnetic recording regions 327, 328, 329 may be oriented by the write field from write pole 320a. The magnetic recording regions 327, 328, 329 become oriented by the write field if the write field ($H_w$) is greater than $H_c$. After a region of the RL 356 in the data track has been exposed to $H_w$, from the write pole 320a and the resulting heat from the optical energy 314 from the near-field transducer 312, the region's temperature falls below the Curie temperature and the data associated with the magnetic orientations is recorded. Specifically, the transitions between recorded regions (such as previously recorded regions 327, 328 and 329) represent written data "bits" that can be read by the read pole 315. In this manner, the near-field transducer 312 uses the optical energy 314 to heat the RL 356 and lower its magnetic coercivity.

The waveguide 310 is formed of a core material 351 such as a high-index-of-refraction dielectric material that is transmissive to radiation at the wavelength of the laser radiation source—e.g., around 780 nm. Typical radiation-transmissive materials include, for example, $TiO_2$ and $Ta_2O_5$. The radiation-transmissive core material 351 is surrounded by a cladding material 352a and 352b that has a lower refractive index than the core material 351 and is transmissive to radiation at the wavelength of a radiation source 302. The radiation source 302 is shown connected to a radiation source submount 306. Typical cladding materials include $SiO_2$ and $Al_2O_3$.

The head 300 may also include a TFC element 340 that functions as a thermal actuator. The TFC element 340 may be recessed from an MFS as shown in FIGS. 3A-3C, or may be extending to the MFS. The head 300 may further include an ECS 345 that functions to detect contact between the head 300 and the magnetic disk 350.

When no power is applied to the TFC element 340, the distance between the head 300 and the magnetic disk 350, also known as the head/disk clearance, is indicated by D1. To help achieving higher areal densities in the HDD 100, the head/disk clearance may be reduced. One method of reducing the head/disk clearance is to utilize the TFC element 340. When power is applied to the TFC element 340, heat from the TFC element 340 protrudes the read pole 315 and the write poles 320a, 320b toward the magnetic disk 350, forming a protrusion as indicated by P1. The head 300 with the protrusion has a reduced head/disk clearance, as indicated by D2.

In FIG. 3B, the head 300 is depicted with localized heating from the radiation source 302, according to one embodiment. During long operations, such as a complete erase procedure, the radiation source 302 will heat up. The heat from the radiation source 302 will be exchanged with the head 300. The heating of the head 300 will cause the head 300 to warp, depicted here as P2, which will change the aerodynamics of the head 200. Thus, the flying height of the head 300 as compared to the magnetic disk 350 will be changed, depicted here as D3, which can lead to touchdown (TD). Once there is a TD, the area on the magnetic disk 350 where the contacting took place may not be used for storing data and may be damaged causing loss of data. Additionally, unintended contact may cause damage to the read/write head. The flying height change is proportional to the radiation source 302 temperature change, as conveyed to the head 300. The temperature change is believed to be localized to the area close to radiation source submount 306. The radiation source submount 306 and the radiation source 302 may both be heated and subsequently, may both transfer heat to the head 300.

FIG. 3C depicts a head 300 with a temperature sensor 220. The temperature sensor 220 may be the same as the temperature sensor 220, described with reference to FIG. 2. The temperature sensor 220 measures the heat that may emanate from the radiation source 302. The temperature may be measured at the radiation source, as it transfers to the radiation source submount 306, or as it transfers to the head 300. The temperature sensor 220 may be used to protect the head 300 from damage. By determining the change in temperature between the ambient temperature and the temperature at the radiation source 302, the flying height may be adjusted. The temperature sensor 220 may be connected to at least one wire pad (not shown) that provides an electrical connection to a connector pad (not shown) located at the top of the head 300—i.e., the side opposite the MFS. From there, a wire may electrically connect the temperature sensor 220 to a secondary communication device.

Using the determined change in temperature, the flying height can be adjusted using the TFC element 340. As described previously, the TFC element heats an area of the head 300 to create the expansion P1. The expansion P1 is designed to bring the read and write elements (e.g. the read pole 315, the write pole 320a, and the return pole 320b) in closer proximity to the RL 356 without contacting the RL 356. The change in temperature can be correlated to a change in flying height for the head 300 and which is used to adjust the expansion P1 such that the protrusion has a the head/disk clearance indicated by D2.

The temperature change at the radiation source 302 can be determined by using either existing or added devices. In one embodiment, the temperature of the radiation source 302 is determined using the optional temperature sensor 220, shown with reference to FIG. 3C. In another embodiment, the temperature of the radiation source 302 is determined as a function of the temperature-dependent increase in resistance at the radiation source 302. Here, the current through the radiation source 302 is measured over a continuity of voltages while maintaining the radiation source 302 a first temperature. The current through the radiation source 302 is then measured over the same continuity of voltages at a second temperature. The second temperature can be higher than the first temperature. Using the measured current and known voltage at each temperature, the resistance at each temperature is determined. The resistance change as a function of temperature is linear. Thus, the first resistance at the first temperature is plotted against the second resistance at the second temperature for each of the known voltages to create a resistance temperature correlation. The resistance temperature correlation is then applied to determine the temperature based on the resistance of the radiation source 302 at a known voltage.

The temperature of the radiation source 302 is then used to adjust the flying height of the head 300. The flying height of the head 300 can be adjusted by a variety of methods, devices and systems. In one embodiment, the flying height of the head 300 is adjusted using the TFC element 340. In another embodiment, the flying height of the slider 104 can be adjusted using an actuator.

Figure 4:
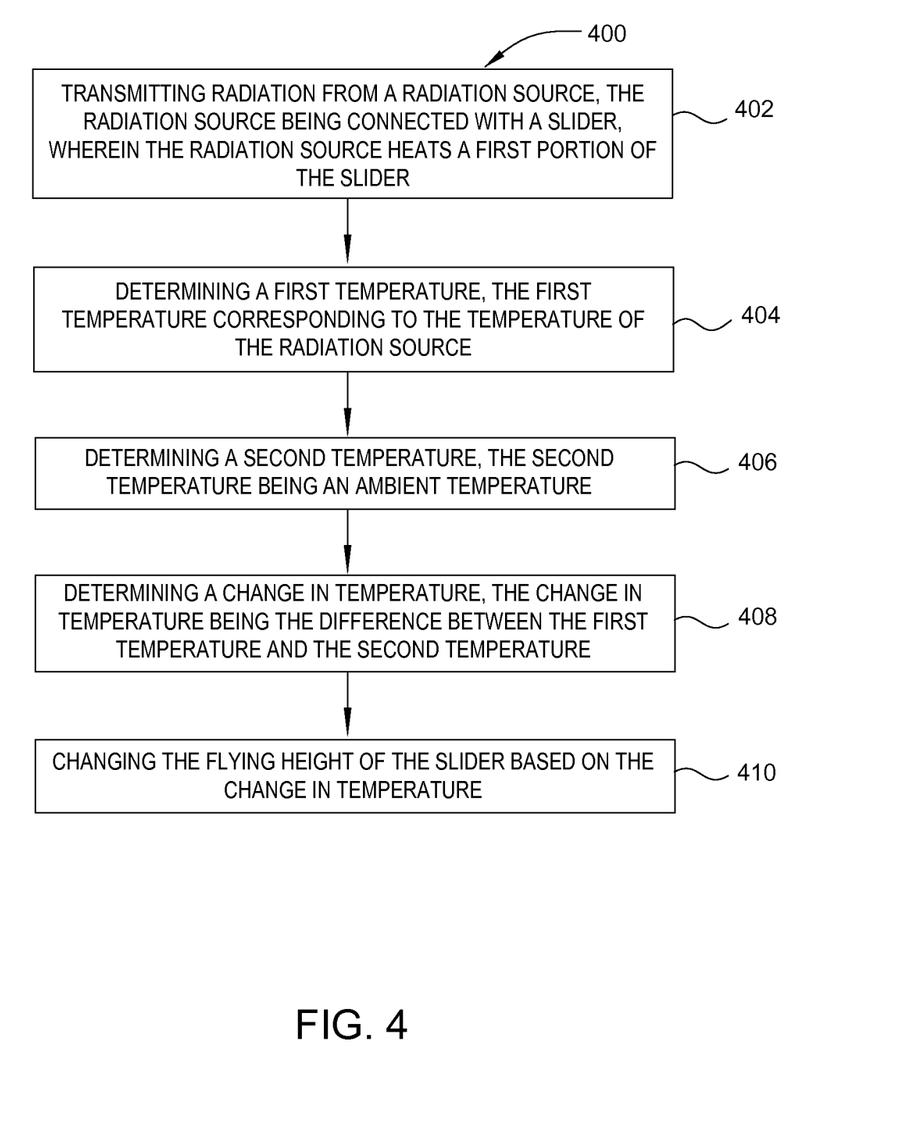
FIG. 4 is block diagram of a method for adjusting flying height, according to one embodiment.

FIG. 4 is block diagram of a method 400 for adjusting flying height, according to one embodiment. The method 400 begins with radiation being transmitted from a radiation source, as in element 402. The radiation source is connected with at least a head. The radiation source can further be connected with a radiation source submount. The radiation source can be between 40 nm and 60 nm. As such, the radiation source may not be self-supporting. Thus, a radiation source submount may be attached to the head, such that the radiation source can produce radiation in a controlled direction.

As described previously, the radiation source can deliver radiation toward the magnetic disk to assist in the write operation. During the radiation delivery, the radiation source can subsequently heat up over time. This heat is transferred to nearby objects, such as the slider. Thus, the radiation source heats up a first portion of the slider. Further, the radiation source heats up the connected radiation source submount, which increases the area of the heated first portion on the slider. Using a laser diode as the radiation source, the local slider temperature (e.g. the first portion) can heat up from 22 degrees Celsius to approximately 61 degrees Celsius over a period of one (1) second of continuous operation. However, any level of operation of the radiation source is expected to heat up the first portion to some extent.

The heating and the subsequent flying height change of the head is transient. The transient change occurs on the order of between about 0.1 seconds and about 1 second after the radiation source is activated. The final steady state value of the change, including the amount of the change in flying height and the time frame for the change, depends on the actual laser power being used. Frequent determinations of the change in temperature may be beneficial to capture the transient nature of the changes and to respond accordingly. The temperature can be measured at least every 1 ms after the radiation source is activated, such as being measured at an interval of 10 ms or less.

Either during or after the operation of the radiation source, a first temperature is determined, as in element 404. The first temperature corresponds to the temperature of the radiation source. The temperature can be determined as described above, such as by correlating the temperature to the increase in resistance of the radiation source. The first temperature can be detected at the radiation source, the radiation source submount or the surface of the slider proximate to the connection between either the radiation source or the radiation source submount. In another embodiment, the first temperature can be detected at a point corresponding to the highest temperature on the surface. Thus, the temperature increase can radiate out from the point. In one embodiment, the first temperature is determined based on resistance at the radiation source, thus the first temperature is determined directly at the radiation source. In another embodiment, the temperature is determined using a temperature sensor. The temperature sensor can be positioned at any of the locations which are affected by the temperature of the radiation source.

Then, a second temperature is determined, as in element 406. The second temperature can be an ambient temperature in the device. In one embodiment, the second temperature is the housing temperature for the device. In another embodiment, the second temperature is the temperature of the slider at a second location which is comparatively unaffected by the temperature of the radiation source. The second temperature can be collected either before, after or concurrent with the collection of the first temperature. The second temperature can be collected using preexisting temperature sensors, such as a drive temperature sensor. In another embodiment, the second temperature is detected using a second temperature sensor. The second temperature sensor can be substantially similar to the temperature sensor 220 described with reference to FIG. 3A-3C.

Using the first temperature and the second temperature, the change in temperature can be determined, as in element 408. The change in temperature is the difference between the first temperature and the second temperature. As stated above, the change in temperature is directly related to the flying height change. As the temperature increases, the slider is expected to expand, with areas of higher temperature expanding more than areas of lower temperature. This expansion is expected to create a bowing effect, with the central area of the slider under the radiation source and the radiation source submount expanding up. This expansion will change the aerodynamics of the head, which will either increase or decrease the flying height of the slider. The expansion will be linear, thus making the change in flying height linear as well.

The change in temperature can then be used to change the flying height of the slider, as in element 410. The association of temperature to flying height can be determined empirically, such as by testing the flying height of the slider using sequentially increasing optical powers or temperatures as detected at the first temperature site described above. The touchdown power (TDP) required for each temperature/optical power is then determined. The TDP is defined as the power input required to cause the slider to make contact with the magnetic disk lubricant. The TDP is known to increase with higher flying heights and can be used here as a proxy for flying height. Once the association between flying height and temperature change is determined, the change in temperature is then applied to determine the appropriate change in flying height. The flying height can be changed as described above, with reference to FIG. 2.

Embodiments described herein disclose methods and devices to provide efficient dynamic control of flying height of a slider in response to temperature changes. During long write operations, a portion of the slider heats up causing changes in the flying height of the slider. By determining the temperature change and associating to a change temperature dependent change in flying height, the flying height of the slider can be maintained in real time and in response to operating conditions.

While the foregoing is directed to exemplary embodiments, other and further embodiments of the invention may be devised without departing from the basic scope thereof, and the scope thereof is determined by the claims that follow.

What is claimed is:

1. A heat assisted magnetic recording (HAMR) head comprising:
    a head body comprising:
        a supporting surface; and
        a media facing surface positioned opposite the supporting surface;
    a radiation source submount positioned on the supporting surface;
    a radiation source positioned on the supporting surface, the radiation source being proximate the radiation source submount;
    a waveguide coupled between the support surface and the media facing surface; and
    a temperature sensor positioned a first distance from the radiation source submount, wherein the temperature sensor is positioned on the supporting surface, wherein the temperature sensor extends away from the media facing surface, wherein the first distance is between 5 nm and 100 nm.

2. The HAMR head of claim 1, wherein the waveguide optically connects the supporting surface with the media facing surface.

3. The HAMR head of claim 1, wherein the radiation source is a laser diode.

4. The HAMR head of claim 1, wherein the temperature sensor is positioned under the radiation source submount.

5. The HAMR head of claim 1, wherein the temperature sensor is connected to the radiation source.

6. The HAMR head of claim 1, further comprising at least one wire pad connected to the temperature sensor.

7. The HAMR head of claim 1, wherein the temperature sensor comprises at least one of Ta, Pt, Au, Rh, NiFe, and combinations thereof.

8. The HAMR head of claim 1, further comprising an ambient temperature sensor distal from the temperature sensor.

9. The HAMR head of claim 1, wherein the first distance between the temperature sensor and the radiation source submount is from 10 nm to 50 nm.

10. A method for adjusting flying height comprising:
    transmitting radiation from a radiation source, the radiation source being connected with a slider and a radiation source submount, wherein the radiation source heats a first portion of the slider, wherein the slider includes a supporting surface and a media facing surface opposite the supporting surface;
    determining a first temperature, the first temperature corresponding to a temperature of the radiation source, wherein the first temperature is detected by a temperature sensor positioned a first distance from the radiation source submount, wherein the temperature sensor is positioned on the supporting surface, wherein the temperature sensor extends away from the media facing surface, wherein the first distance is between 5 nm and 100 nm;
    determining a second temperature, the second temperature being an ambient temperature;
    determining a change in temperature, the change in temperature being a difference between the first temperature and the second temperature; and
    changing the flying height of the slider based on the change in temperature.

11. The method of claim 10, further comprising determining the change in flying height by correlating the first temperature to a touchdown power.

12. The method of claim 10, wherein the temperature sensor is located proximate to the radiation source.

13. The method of claim 10, wherein the first temperature is detected at a point corresponding to a highest temperature on the supporting surface of the slider.

14. The method of claim 10, wherein the second temperature is detected by a drive temperature sensor.

15. The method of claim 10, wherein the flying height is changed using a thermal fly height controller.

16. The method of claim 10, wherein the flying height is continually adjusted during operation of the radiation source.

* * * * *